United States Patent
Minowa et al.

(10) Patent No.: US 8,115,364 B2
(45) Date of Patent: Feb. 14, 2012

(54) PERMANENT MAGNET GENERATOR AND WIND POWER GENERATOR HAVING A MULTI-STAGE ROTOR AND STATOR

(75) Inventors: Takehisa Minowa, Tokyo (JP); Hideki Kobayashi, Tokyo (JP); Koji Miyata, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 324 days.

(21) Appl. No.: 12/040,085

(22) Filed: Feb. 29, 2008

(65) Prior Publication Data

US 2008/0231132 A1    Sep. 25, 2008

(30) Foreign Application Priority Data

Mar. 23, 2007  (JP) .................................. 2007-076031
Nov. 13, 2007  (JP) .................................. 2007-294098

(51) Int. Cl.
*H02K 1/22* (2006.01)
*H02K 16/02* (2006.01)
*H02K 16/00* (2006.01)
*H02K 21/10* (2006.01)

(52) U.S. Cl. ........ 310/268; 310/266; 310/267; 310/237; 310/114; 310/156.37

(58) Field of Classification Search .................. 310/114, 310/156.37, 126, 266–268; 3/114; *H02K 16/02, H02K 16/00, 21/00*
See application file for complete search history.

(56) References Cited

U.S. PATENT DOCUMENTS

| | | | |
|---|---|---|---|
| 5,021,698 A | | 6/1991 | Pullen et al. |
| 6,246,146 B1 * | | 6/2001 | Schiller .......................... 310/268 |
| 6,720,688 B1 * | | 4/2004 | Schiller ............................ 310/64 |
| 7,049,722 B2 * | | 5/2006 | Rose .......................... 310/156.01 |

(Continued)

FOREIGN PATENT DOCUMENTS

JP    2-74142 A    3/1990

(Continued)

OTHER PUBLICATIONS

The 29TH Symposium on Uses of Wind Energy, Research of High Power Core-Less Wind Turbine Generator With Multi Magnetic Circuits, Hideki Kobayashi et al., Nov. 2007, Japan Wind Energy Associate, pp. 1-9, pp. 279-282, Attached Is Concise English Explanation of Relevance.

(Continued)

*Primary Examiner* — Quyen Leung
*Assistant Examiner* — Terrance Kenerly
(74) *Attorney, Agent, or Firm* — Roberts Mlotkowski Safran & Cole, P.C.; David S. Safran

(57) ABSTRACT

A permanent magnet power generator which, when used at an electric power generating facility such as a wind power plant, etc., would not be bulky and would not impede wind capture by a wind turbine; instead, it can raise the generated voltage without impeding wind capture has a generator shaft; at least three rotors, which are secured with the generator shaft, constituted by a plurality of plate-shaped structures having a permanent magnet attached thereto, and each disposed in the longitudinal direction of the generator shaft; and a stator, which is plate-shaped with a stator coil disposed in at least two gaps formed by the rotors, evenly-spaced apart from the generator shaft. The rotors and stators are disposed alternately in the longitudinal direction of the generator shaft, with a total of at least five stages. Also a wind power generator with a propeller on the shaft of this permanent magnet generator.

8 Claims, 6 Drawing Sheets

U.S. PATENT DOCUMENTS

| | | | |
|---|---|---|---|
| 2002/0007875 A1* | 1/2002 | Yamamoto et al. | 148/302 |
| 2007/0024144 A1* | 2/2007 | Obidniak | 310/156.36 |
| 2007/0069600 A1* | 3/2007 | Hiramatsu | 310/156.32 |

FOREIGN PATENT DOCUMENTS

| | | | |
|---|---|---|---|
| JP | 2002-153036 A | | 5/2002 |
| JP | 2003-348805 A | | 12/2003 |
| JP | 3100702 U | | 1/2004 |
| JP | 2004-312911 A | | 11/2004 |
| JP | 2005-218263 A | | 8/2005 |
| JP | 2007-336784 A | | 12/2007 |
| WO | WO2005119886 | * | 12/2005 |
| WO | 2006/068042 A1 | | 6/2006 |

OTHER PUBLICATIONS

International Search Report for International Application No. PCT/JP2008/053673.

Beijing Sunhope Intellectual Property Limited, Second Office Action on Chinese Patent Application for Inventionnno. 200880009137.6 in the Name of Shin-Etsu Chemical Co., Ltd., Dated June 3, 2011 With English Translation.

* cited by examiner

FIG.7(A)     FIG.7(B)
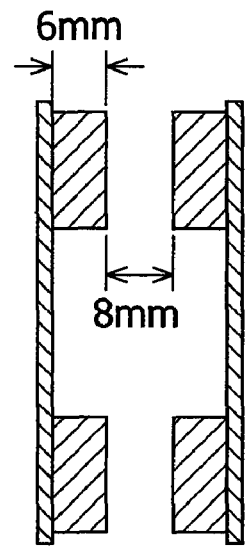 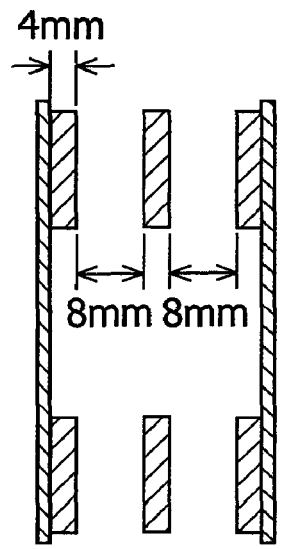
FIG.8
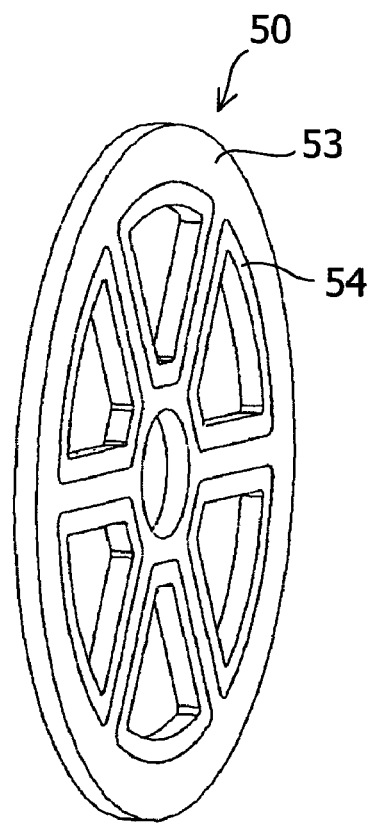

PERMANENT MAGNET GENERATOR AND WIND POWER GENERATOR HAVING A MULTI-STAGE ROTOR AND STATOR

BACKGROUND

In wind-power generation, rotational energy is converted into electrical energy by transmitting the rotary action of propellers to a rotor shaft of a power generator. The output of a power generator is either connected to system power, or stored in batteries and used as electrical power when necessary. Since the generating electrical power depends on the specifications of the power generator, the power generator is selected to match the electrical power generating facility.

There are several types of power generators, including, for example, a type that uses coils, and a type that uses permanent magnets as field magnets, or, regarding their construction, a radial type, in which a stator surrounds the outside of a cylindrical rotor, and an axial type, in which a stator faces a disc-shaped rotor in the axial direction, etc. Each type has its own advantages and disadvantages, but the permanent magnet type is used as field magnets if the efficiency of power generation is significant because it can generate a stronger magnetic field, increase magnetic flux linked to the armature coil and raise the induced voltage compared to the coil field magnet type having the same physical size.

Since electrical power energy depends largely on a power generator's efficiency, there is a demand for power generators having higher efficiency. In particular, in the wind power generation, generators are used at a rotational speed of no more than several hundred rpm, which is considerably lower than in other forms of electrical power generation. Since the generated voltage is proportional to a power generator's rotational speed, if a power generator employed in the other power generation method is used as a wind power generator without additional modifications, the generated voltage will drop. Charge pump circuitry is thus essential in order to raise the generated voltage, resulting in a cost increase. The voltage can be raised by raising the rotational speed. While the voltage may also be raised by interposing an acceleration gear between the propeller shaft and the rotor shaft of the power generator, this method is undesirable because the gear may cause gear-induced torque losses and may become a factor of noise generation and reduced equipment reliability along with an important cost increase factor.

In addition, the generated voltage is proportional to the number of magnetic poles of the field magnets. While the number of coils or magnets of a rotor can be increased in order to increase the number of magnetic poles, magnetic field of the field magnets may decrease because each coil or magnet must be small. Accordingly, one option may be to enlarge the diameter of a rotor for increasing magnetic poles by increasing the number of coils or magnets of the same size keeping the magnetic field of the field magnets. Such method is practical, however, enlarging the diameter of the rotors of a power generator means making the overall diameter of the power generator larger, which is undesirable for the following reasons in case of wind power generation.

While there are two types of wind turbines, i.e. a vertical axis type, in which the axis of rotation is perpendicular to the direction of the wind, and a horizontal axis type, in which it is parallel thereto, the horizontal axis type is generally used due to its high efficiency at high wind speeds. In the horizontal axis type, the size of the power generator directly connected to the rotor shaft at the center of the propeller affects the wind-capturing capacity of the propeller. Namely, as is shown by the wind power generator of FIG. 11, the wind-capturing area of the propeller is decreased and the rotational force of the propeller is reduced in proportion to the enlargement of the nacelle 61 housing the power generator 62. In other words, the efficiency of wind power generation drops as the power generator becomes large. JP2002-153036A discloses a coreless power generator applied to wind power generation. Such generator significantly reduces the wind-capturing area if the outside diameter of the power generator becomes larger.

SUMMARY

A power generator suitable for a power generation facility such as a wind power generation plant is described herein. That is not a bulky electric generator which may prevent capturing wind by the propeller, but a generator capable of increasing the generated voltage without preventing wind capture.

A permanent magnet generator can be provided that comprises a generator shaft; at least three rotors coupled to the generator shaft, rotors having a plate-shaped structures with permanent magnets attached thereto, and each rotor being disposed in the longitudinal direction of said generator shaft; and stators having a plate-shaped structures with a stator coil of a wound copper wire disposed in at least two gaps formed by said rotors, said stators being separated from said generator shaft, said rotors and stators being disposed in alternate plates in the longitudinal direction of said generator shaft, with the number of rotors and stators not less than five.

In a preferred embodiment of a permanent magnet generator, each of the above-mentioned rotors and stators is disc-shaped; the permanent magnets attached to each rotor are placed evenly-spaced apart in the circumferential direction of the same rotor, with no less than four magnetic poles; and said stator coils are evenly-spaced apart in the circumferential direction of the same stator, with no less than three poles in said stators.

In another preferred embodiment of a permanent magnet generator, the above-mentioned stator coils are connected in series in single-phase or connected together in series in three-phase.

In another preferred embodiment of a permanent magnet generator, among said at least three rotor stages, the rotors at both ends have permanent magnets attached to a side of a plate-shaped yoke made of magnetic material, the side of which faces a stator. The magnetic flux generated from said permanent magnets flows back into said yokes, thereby reducing the magnetic leakage from said rotors at the both ends.

In another preferred embodiment of a permanent magnet generator, the rotors other than the above mentioned end rotors may be obtained by adhering magnets to a yoke made of nonmagnetic material.

Furthermore, in accordance with a permanent magnet generator as described herein, it is possible to provide a wind power generator obtained by installing propellers on the shaft of the permanent magnet generator.

A permanent magnet generator as described herein can generate significantly higher voltage and greater power than the conventional one in the use of comparatively low rotational speeds, specifically more than 0 rpm and not more than 2000 rpm, preferably more than 0 rpm and not more than 1000 rpm, such as wind power and water power generation. If a permanent magnet generator as described herein is applied to a wind power plant, the generated voltage can be raised without reducing the wind-capturing area and thereby sufficiently capturing the energy of the wind, which eliminates the use of an accelerating gear in order to increase the rotational speed of the power generator or a circuitry in order to boost the generated voltage. Moreover, due to an efficient arrangement of the magnets, it can produce a large magnetic field and high electrical power generation efficiency even if the quantity of magnets used is small.

Power may generate in the stator coils. In the multi-stage stator of the permanent magnet generator, inter-stator coil connections can be made variable unlike in the conventional single stator. In other words, when one wishes to gain a high voltage, it is sufficient to connect all the stators in series, and when one wishes to gain a low voltage coupled with a large current, it is sufficient to connect some or all of the stators in parallel. Accordingly, a permanent magnet generator as described herein may allow ready modification of power generation specifications.

BRIEF DESCRIPTION OF THE DRAWINGS

FIG. 7A illustrates a three-stage situation with two rotor stages and a single stator stage, and FIG. 7B illustrates a five-stage situation with three rotor stages and two stator stages, with the total weight of the magnets being the same.

FIG. 8 illustrates a stator with six coils.

DETAILED DESCRIPTION OF THE PREFERRED EMBODIMENT(S)

Figure 1A:
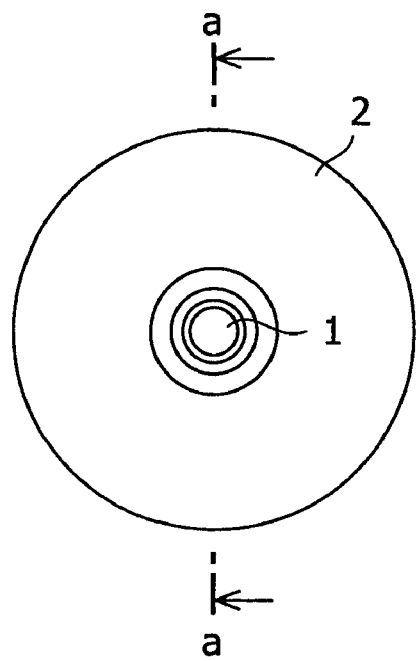
FIG. 1A illustrates an example of a power generator, as seen from the side that allows coupling to a propeller, etc.
Figure 1B:
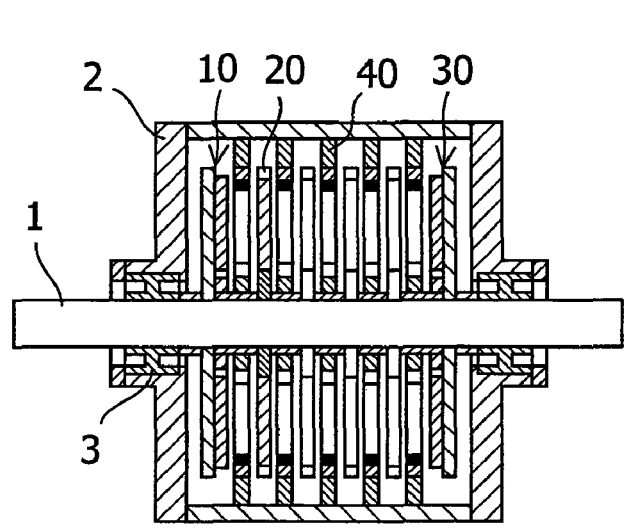
FIG. 1B shows a cross-sectional view thereof taken along line a-a.

An embodiment of a permanent magnet generator is illustrated in FIG. 1. FIG. 1A illustrates an example of the power generator as seen from the side that allows coupling to a propeller, etc. with a cross-sectional view thereof taken along line a-a shown in FIG. 1B. A shaft 1, which transmits a rotational force, is rotatably supported by a housing 2 via a bearing 3. One end of the shaft 1 is connectable to a propeller, etc. such that the rotational force can be transmitted to the power generator. Multiple rotors 10, 20, 30 are secured with the shaft 1, these rotors 10, 20, 30 rotating in sync with the shaft. In other words, the construction of the power generator comprises rotors 10, 20, 30 having permanent magnets disposed on plate-shaped structures directly connected to the generator shaft 1, and stators 40 having multiple coils arranged in locations facing the rotational path of the permanent magnets, with multiple stages of such rotors and stators stacked in the alternate layers.

Figure 2:
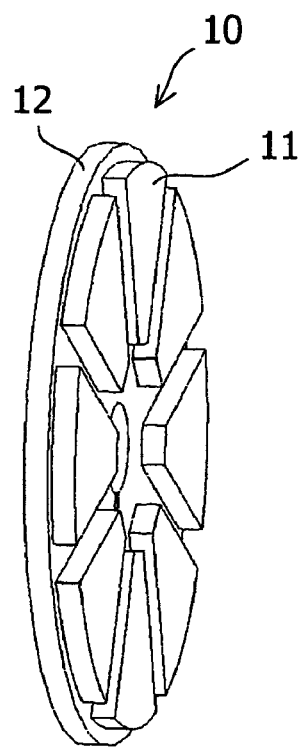
FIG. 2 illustrates an embodiment of a terminal rotor used in a permanent magnet generator.
Figure 3:
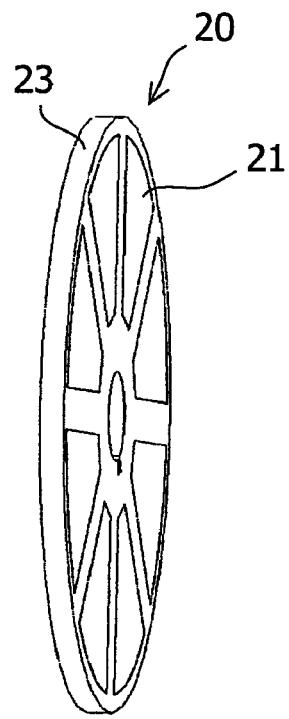
FIG. 3 illustrates an embodiment of a rotor used in a permanent magnet generator.

For instance, as shown in FIG. 2 and FIG. 3, on a single rotor, there are multiple permanent magnets 11, 21 arranged evenly-spaced apart concentrically. Although the permanent magnet generator makes it possible to increase the number of the magnetic poles created by the permanent magnets disposed on each rotor in case of a size increase, the number of poles is preferably not less than four, and even more preferably, not less than four and not more than 48 poles, while the number of the stator coils facing the magnet poles is preferably not less than three, and even more preferably, not less than four and not more than 48. When the number of poles of the magnets is less than four poles, generated voltage may sometimes be insufficient. The polarity of the magnets is oriented in the axial direction. The adjacent magnets are disposed so as to have opposite polarity. In FIG. 2 and FIG. 3, a rotor with eight poles (eight magnets) is formed.

In the case of a single-phase alternating current, the ratio of the number of the magnetic poles to the number of the coils is 1:1. In the case of a three-phase alternating current, the ratio may be 4:3, 2:3, 8:9, 10:9, 10:12, 12:15 etc. Particularly preferable ratio may be 4:3 and 2:3.

There are multiple (three or more) rotor stages and the magnets attached to the rotors are preferably of the same number i.e. the same number of poles, and their shape may be fan-like or rectangular. Furthermore, the polarity of the magnets on the rotors may have the same arrangement in all the rotors. In other words, an N-pole magnet of one rotor and a magnet of another rotor in a directly opposed position may be both N-pole magnets, resulting in a mutual enhancement of the magnetic field generated in the gaps between the rotors.

There are provided at least three stages of plate-shaped rotors, on which these permanent magnets are arranged, and stators having stator coils are disposed in at least two gaps formed by these rotors, with at least a total of 5 rotor and stator stages stacked in the alternate layers. If there is an enlargement in shape, the number of stages can increase as well, and while there is no particular upper limit, 101 stages or less is preferable. If the multiple rotors are arranged so that the polarity of the magnets is aligned, the permeance of the magnetic circuits in the power generator increases and a larger magnetic flux can be emanated from the permanent magnets.

Not only does this arrangement structure of stages make the voltage higher than in a single-stage or two-stage magnet rotor system having the same magnet mass and the same number of poles arranged therein, but it also can increase the magnitude of the magnetic flux emanated in the gaps.

In a preferred embodiment of a permanent magnet generator, among said at least three rotor stages, the rotors at the both ends may comprise a (preferably disc-shaped) yoke, wherein the yoke is made of a magnetic material and adhered to a pole face of the magnets which do not face the stators. Such magnetic rotors facilitates reflux flow of magnetic flux generated from the magnetic poles into the yokes and reduces the magnetic leakage outside the rotors at both ends, torque losses due to the eddy currents induced by the magnetic leakage flux in the housing can be alleviated, and simultaneously the magnitude of magnetic flux of the corresponding gaps can be increased, resulting in an enhanced power generation performance.

Among the multiple rotor stages, the two terminal rotors 10 and 30 located at the both ends, unlike the other rotors, are produced, as shown in the example of the terminal rotor 10 of FIG. 2, by adhering permanent magnets 11 to a yoke 12, which is preferably made of ferromagnetic material, with an adhesive (e.g. epoxy resin, acrylic resin). Consequently, the magnetic field between the terminal rotor and the rotor opposed thereto is enhanced while magnetic field leakage to the housing is concurrently suppressed. Consequently, the eddy currents generated in the housing are kept down to a minimum and the braking force exerted by the eddy currents on rotation is eliminated.

So long as the yoke is made of magnetic material, there are no particular limitations with regard to that material, which may be exemplified, for instance, by iron or magnetic stainless steel.

The rotors 20 other than the terminal rotors preferably have magnets secured with nonmagnetic material such as Al, stainless steel and resin. Even more preferably, as shown in FIG. 3, magnets 21 are embedded into a frame of nonmagnetic material 23. Consequently, the same magnetic field can be generated in the gaps on both sides of said rotors and the use of nonmagnetic materials for the construction of the frame makes it possible to avoid weakening the magnetic field that emanates from the magnets.

In addition, in another embodiment, nonmagnetic material can be adhered to one or both sides of the magnets.

The reason why the adoption of nonmagnetic materials enhances the magnetic field emanating from the magnets will be explained in detail below based on a comparison with an embodiment representing conventional technique.

Figure 12A:
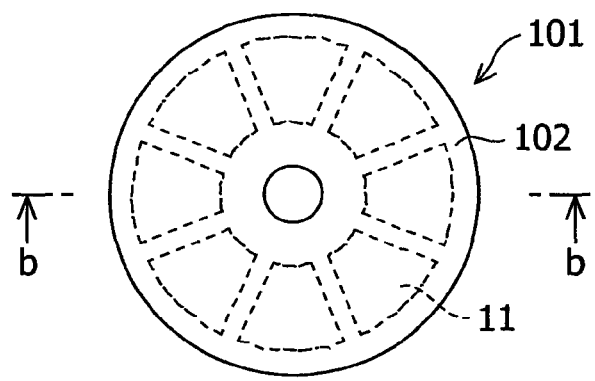
FIG. 12A illustrates a conventional power generator as seen in the axial direction of the shaft.
Figure 12B:
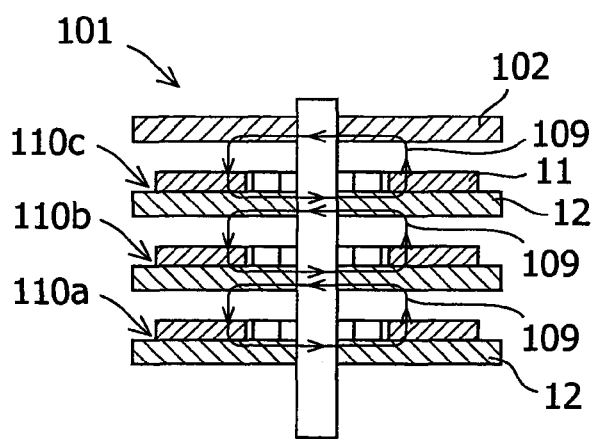
FIG. 12B shows a conceptual diagram of magnetic lines of force as seen on a cross-section taken along line b-b.

As shown in FIG. 12, the conventional rotor 110 represented by JP2003-348805 etc. typically comprises multiple magnets 11 attached to a single round-shaped yoke 12, and such rotors (110a, 110b, 110c) are stacked with spaces between each rotors for inserting stators. In this case, a unit of a rotor and a stator can be seen as a single power generator. A multi-stage power generator is formed by stacking the units. A yoke-only rotor 102 caps and sandwiches the stator with the yokes. In the embodiment of FIG. 12, one rotor is composed of a yoke and magnets. If such rotors are stacked in multiple stages, each magnetic line of force 109 passes through the adjacent yoke and refluxes as shown in FIG. 12. Consequently, the magnetic lines of force created by the magnetomotive force of a single rotor pass through a gap between the rotors where a stator is inserted. The same is applied to each rotor of the multi-stage power generator, with the same flow of magnetic lines of force obtained and the magnetic field in the gaps being the same in each power generator. Since there is a yoke in each rotor, the magnetic lines of force emanated from one rotor fail to pass through the yoke of the adjacent rotor due to the magnetic field shielding effect of the yoke. Consequently the magnetic lines cannot reach the opposite gap and the magnetic field density of each gap decreases.

Conversely, in the permanent magnet generator as described herein, there are only two yokes, which permits a reduction in the axial dimensions and a reduction in weight in comparison with conventional technology. Consequently, the generator can be made lower in cost than in the past.

Figure 10A:
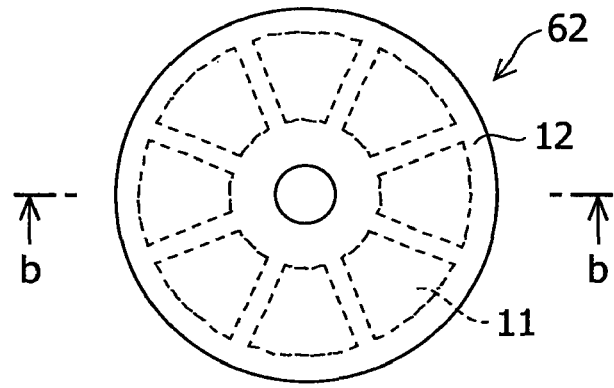
FIG. 10A illustrates the permanent magnet generator as seen in the axial direction of the shaft.
Figure 10B:
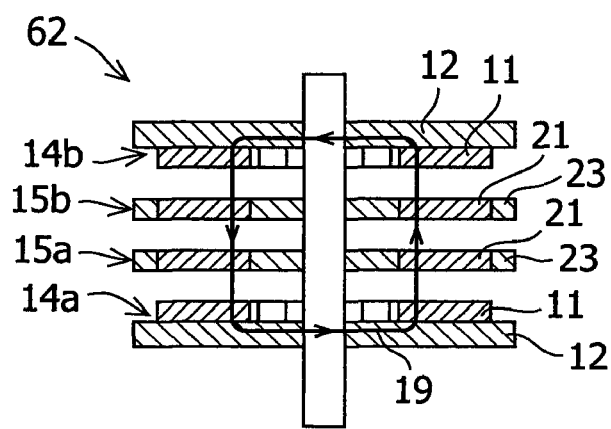
FIG. 10B shows a conceptual diagram of magnetic lines of force as seen on a cross-section taken along line b-b.
Figure 11:
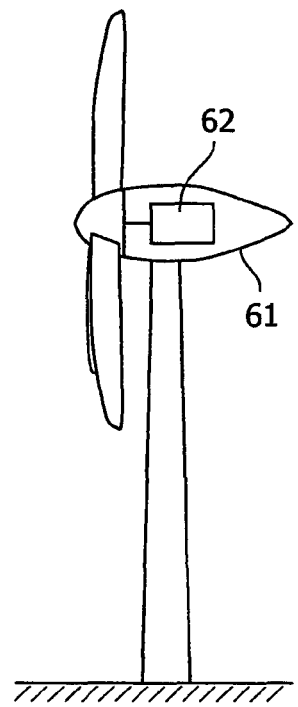
FIG. 11 illustrates a wind power generator.

On the other hand, in an embodiment of a permanent magnet generator, as shown in FIG. 10, two rotors are disposed at both ends of the shaft in the longitudinal direction and multiple rotors are stacked in between, wherein the rotor comprises multiple magnets and a round-shaped yoke adhered thereto. The two rotors 15a, 15b other than the end rotors 14a, 14b are manufactured without yokes by securing magnets 21 to nonmagnetic material 23. In such configuration the generated magnetic lines of force 19 pass through the magnet of each rotor and reflux to the terminal yoke 12. Thus, the magnetic lines of force 19, which represent the sum of the magneto-motive forces emanating from each magnet of each rotor, may pass through the gaps of the rotors, and the magnetic field intensity in the spaces may be significantly increased compared to the above-described conventional art. Namely, the magnets of all the rotors may mutually enhance each other's magnetic fields, strengthening the magnetic field in the gaps.

Accordingly, a power generator may comprise two terminal rotors, multiple rotors disposed in between, and stators disposed between the rotors, thereby forming a single high-performance power generator instead of stacking a plurality of a generator unit in multiple stages.

In the power generator, magnetic field intensity can be significantly increased when compared to the conventional ones. The voltage generated in the permanent magnet generator can be significantly increased because the generated voltage is practically proportional to the intensity of the magnetic field. Therefore, in the power generator, an extremely strong multi-pole magnetic field is formed in the gaps between the rotors.

The smaller the gaps between the rotors, the more intense the resulting fields are. It is therefore desirable to make the gaps as small as possible.

Because every rotor of the conventional generator has a yoke, when the rotors are stacked in multiple stages, the total thickness of the yokes is of course the product of the thickness of each yoke and the number of stages; in the present permanent magnet generator, however, the yokes are only provided in the terminal rotors and, consequently, regardless of the increase in the number of the stages, the total thickness of the yokes will always be double the thickness of a single yoke. Therefore, the total thickness of the yokes is kept low and, even if the number of stages is increased, keeping the size of the generator main body compact in the axial direction. Consequently, its weight can be lowered and its cost can be reduced.

Figure 4:
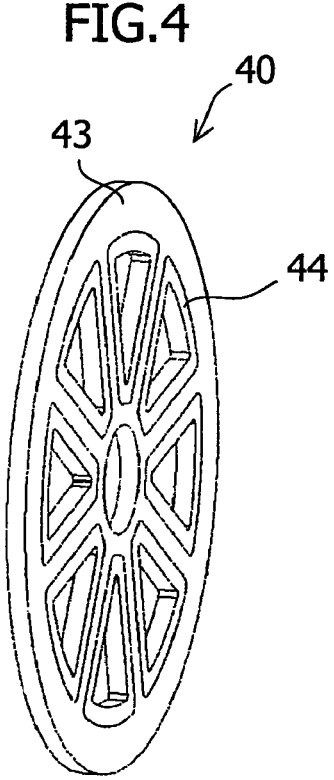
FIG. 4 illustrates an embodiment of a stator used in a permanent magnet generator.

As shown in FIG. 4, a stator 40 comprising multiple coils may be disposed in the gaps between rotors. The stators 40 are secured, for instance, with the containing housing 2. In the stators 40, coils 44 are preferably embedded in a coil frame 43. In order to prevent the generation of eddy currents, the coil frame 43 is made of insulating material such as resin, etc. All the stators may be preferably formed such that they may have the same number of coils. The shape of the coils is preferably generally the same as the shape of the magnets. In a single phase, neighboring coils are preferably wound in mutually opposed directions and connected in series. In three phases, it is preferable that three groups be formed, with every third coil in the circumferential direction connected in series, to be used as a three-phase winding.

In a permanent magnet generator as described herein, the rotors and stators are disposed in an alternating fashion in the axial direction of the shaft. Supposing that the thickness of the terminal rotors at both ends should be the sum of the thickness of the yokes and the height of the permanent magnets protruding from the yokes, all the gaps between the rotors are preferably the same. Regarding the stators disposed in the gaps, the clearances between a stator and a rotor are preferably uniform so as not to impede the rotation of the rotors.

The rotors and stators are preferably disc-shaped, with their diameter preferably of 50 to 6000 mm. The thickness of rotors having permanent magnets varies depending on the mass of the permanent magnets disposed thereon, preferably ranges from 2 to 400 mm, and the terminal rotors, preferably ranges from 3 to 600 mm. The thickness of the stator with the stator coils preferably ranges from 1 to 500 mm in the direction of the axis of rotation.

When a rotational force is transmitted from the propellers to the shaft, all the rotors rotate in sync with the shaft. The magnetic fields formed in the gaps (spaces) between the rotors rotate in sync as well. Consequently, synchronized rotating magnetic fields are imparted to the stators and the induced electromotive force is also synchronized among the stators. A single-phase AC electromotive force is obtained if the number of coils of each stator is made equal to the number of magnetic poles of each rotor, and a three-phase AC electromotive force is obtained if it is made equal to 0.75 times that number. The coils installed in the stators are all wired together in series, and, furthermore, the stators are also all wired in series. Consequently, due to the fact that the overall electromotive force is proportional to the number of stator stages, a higher generated voltage can be readily gained by increasing the number of stator stages. In other words, stacking the stages results in an increase in the number of magnetic poles and raises the output voltage without enlarging the outer shape for increasing the number of poles. The AC electromotive force gained from a power generator is rectified via a rectifier and then stored in a battery or transmitted.

In this manner, while the size of a power generator main body in the axial direction is increased when the number of rotors and stators in the axial direction of the rotary shaft is increased, when it is housed in the nacelle of a horizontal axis type wind turbine, the wind capturing area is not reduced. While an enlargement in the diameter of the power generator is indeed associated with a reduction in the wind capturing area, in the power generator as described herein, the generated voltage is raised by increasing its size in the axial direction without increasing the diameter, which does not affect wind capture, and, therefore, makes it possible to convert wind energy into rotational energy without loss. Desirably, the wind power generator can make three-sixty in accord with the direction of the wind via propellers made of commonly used reinforced plastics.

Although there are no particular limitations on the permanent magnets used in the permanent magnet generator described herein, these are preferably high-performance rare earth magnets containing rare earth elements. Rare earth bonded magnets or rare earth sintered magnets composed of so-called rare earth intermetallic compounds are preferred, but even more preferable are Nd-based anisotropic sintered magnets. Due to their high energy products and a large generated magnetic field, they are preferable because they improve electrical power generation performance and are inexpensive from the standpoint of magnet cost.

So long as the construction of the power generator has several stacked stages of multi-pole magnet rotors and stators according to the permanent magnet generator as described above, even if the rotational speed does not increase in the course of wind-based power generation, the generated voltage can be raised, thereby enabling high-efficiency power generation. Furthermore, the power generator of the present Application is applicable to water-based electrical power generation as well.

Below, the permanent magnet generator as described herein is explained with reference to exemplary embodiments; the claims, however, are not limited thereto.

Exemplary Embodiment 1

A power generator illustrated in FIG. 1 was fabricated. The fabricated power generator was designed to have a variable number of rotor and stator stages, and the respective generated voltages produced by varying the number of stages were measured. The shaft was made of stainless steel and had a diameter of 15 mm. In the terminal rotors, eight NdFeB permanent magnets (with magnetic poles oriented in the axial direction and a thickness of 4 mm) were concentrically attached to an iron yoke with a diameter of 100 mm and a thickness of 2 mm using an adhesive (epoxy resin), arranging them such that the orientation of the equidistant magnetic poles was reversed in an alternating fashion. Moreover, in the internal rotors, a stainless steel member with a diameter of 100 mm and a thickness of 4 mm had eight equidistant holes formed therein for embedding magnets and the same NdFeB permanent magnets (thickness: 4 mm) were embedded in the respective holes and adhered thereto with an adhesive (epoxy resin). The respective rotors were attached to the shaft with a clearance of 8 mm (the thickness of the terminal rotors was the sum of the thickness of the permanent magnet and the thickness of the yoke). These rotors were secured with a key so as to rotate integrally with the shaft without slipping. The stators had a diameter of 120 mm and were made of resin. The stators had throughholes equally-spaced for embedding coils. The copper wire coils (30 turns) were separately fabricated, embedded in the throughholes and secured with an adhesive. The embedded coils were all connected in series. Each stator was also connected in series. The housing had a diameter of 130 mm and a length of 110 mm. The housing was made of aluminum. The housing was secured with the stators with bolts. The shaft was rotatably supported by a bearing attached to the housing. The power generator was directly attached to a separately-provided motor so as to rotate the shaft and generated voltage was then measured.

Figure 5:
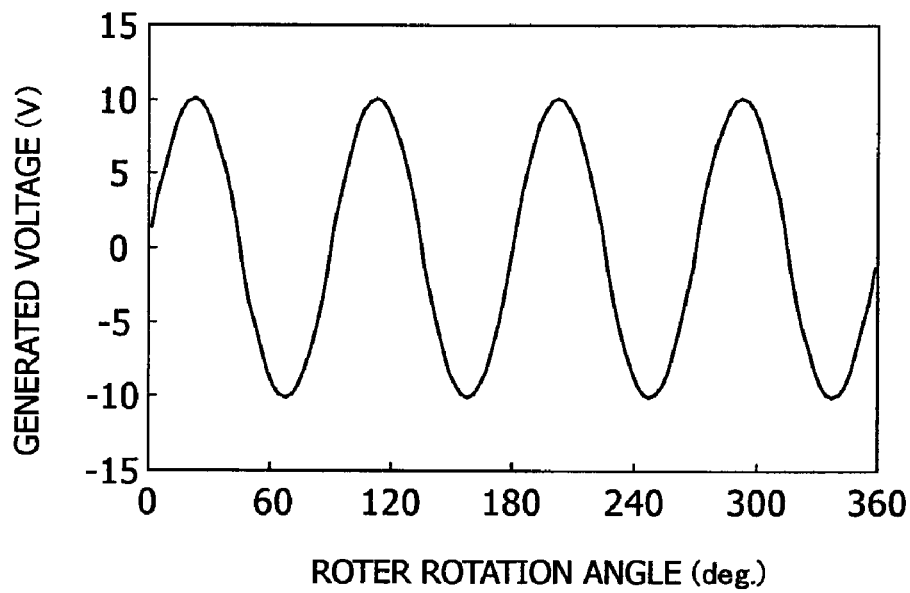
FIG. 5 illustrates a generated voltage waveform gained at a rotational speed of 450 rpm with a motor.
Figure 6:
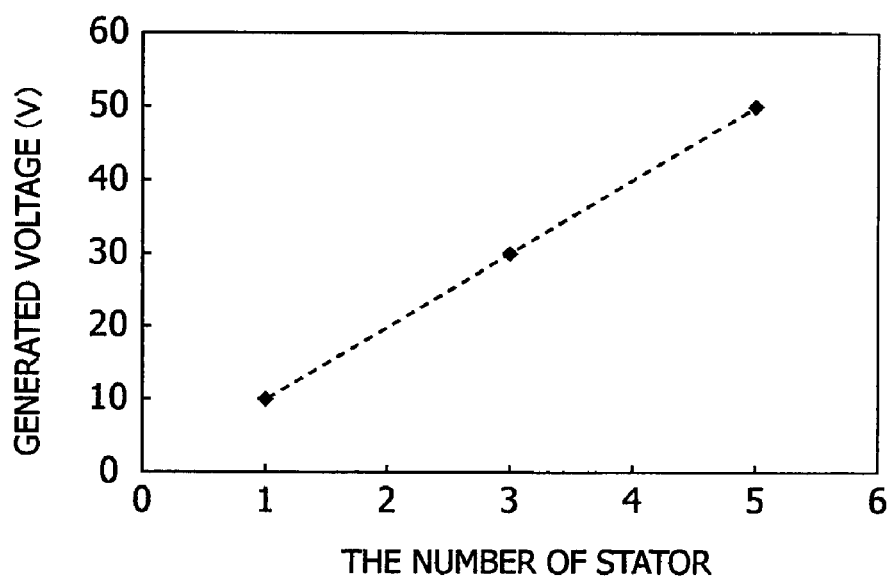
FIG. 6 illustrates the relationship between the number of stator stages and the generated voltage.

The power generator was composed of two rotors and one stator. FIG. 5 shows a waveform of the generated voltage gained by the motor at a rotational speed of 450 rpm. The observed waveform was near-sinusoidal, with a peak value of about 10V. After conducting the same measurements for a case with four rotors and three stators, as well as for a case with six rotors and five stators, the peak voltage was plotted to the number of stators in FIG. 6. As is evident from these results, the generated voltage increased in proportion to the number of stator stages.

Exemplary Embodiment 2

In FIG. 7, a comparison was carried out between (A) a three-stage situation with two rotors and a single stator and (B) a five-stage situation with three rotors and two stators (stators were not shown), in the same total weight of the magnets. Both the magnet configuration of the rotors and stators were identical to that of Exemplary Embodiment 1. Each stator had the same specification. Each rotor had eight poles, a diameter of 100 mm, and a rotor gap of 8 mm. Moreover, in case of five stages, the thickness of the magnets was 4 mm and in case of three stages the thickness of the magnets was 6 mm. In the five stages the peak voltages was 18V at a rotational speed of 450 rpm. In the three stages the peak voltage was 11V. Accordingly, the generated voltage can be raised considerably in the five stages compared to the three stages while the amount of used magnets was the same.

Exemplary Embodiment 3

In another comparison, a three-stage type generator with two rotors and one stator, wherein the rotor diameter was enlarged and the number of poles increased, was compared with the five-stage type generator of Exemplary Embodiment 2. Both the magnet configuration of the rotors and stators were identical to that of Exemplary Embodiment 1. The three-stage type generator had a rotor diameter of 130 mm and ten poles, and the thickness of its magnets was set to 4.8 mm so as to make the total weight of the magnets identical to that of the five-stage type. In the three-stage type generator, the peak voltage was 17V at a rotational speed of 450 rpm. Accordingly, despite the fact that the three-stage type had a diameter that was 30% larger and a surface area that was 69% larger than in the five-stage type of Exemplary Embodiment 2, it had a similar peak voltage or even a lower one.

Exemplary Embodiment 4

Figure 9:
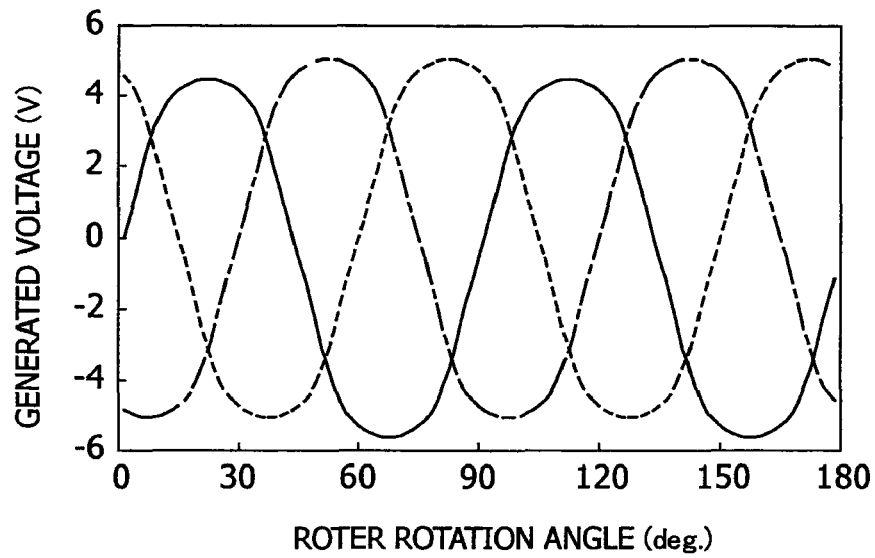
FIG. 9 illustrates the relationship between the angle of rotation of the rotor and the generated voltage.

This embodiment illustrates an example with five stages, i.e. three rotors and two stators, in which a three-phase AC electromotive force was gained with 8 poles (number of magnets: 8, NdFeB type sintered magnets) and 6 stator coils. Otherwise, the configuration was identical to that of Exemplary Embodiment 1. The same rotors were used as in Exemplary Embodiment 1. As shown in FIG. 8, the stators 50 (thickness: 5 mm) had six coils 54 embedded in a coil frame 53. Two mutually opposed coils sandwiching the rotary shaft were wired in series and the same kind of wiring was used in the adjacent stators as well, with coils opposed in the axial direction in the two stators wired in series. FIG. 9 showed a measurement result of a generated voltage at 450 rpm gained in the three groups of coils. The result showed that a three-phase AC current was gained if the number of the stators was equal to 0.75 times the number of the magnet poles or 0.75× integer multiple thereof.

REFERENCE EXAMPLE

A comparison was carried out between a conventional configuration shown in FIG. 12 and the configuration of the permanent magnet generator shown in FIG. 10. In both cases the stators were the same as those of Exemplary Embodiment 1. Each was disposed in three gaps. All the rotors had 8-poles, with the iron yokes all having a diameter of 100 mm, a thickness of 3 mm, and a magnet thickness of 6 mm. The nonmagnetic frames were made of stainless steel and had a diameter of 100 mm and a thickness of 6 mm. The rotors depicted in FIGS. 10 and 12 were attached to the shaft with gaps provided therebetween in such a manner that the gaps were 8 mm wide. The thickness of the rotors 14a, 14b at the opposite ends depicted in FIG. 10, as well as that of the rotors 110a, 110b, 110c depicted in FIG. 12, was a sum of the thickness of the permanent magnets and the thickness of the yokes. Moreover, in the embodiment of FIG. 10, the thickness of the rotors other than the rotors at the opposite ends, i.e. rotors 15a, 15b, was the same as the thickness of the permanent magnets.

As a result of measuring the generated voltages of these two power generators, it was found that the voltage was 24V in the conventional configuration and 33V in the configuration of the permanent magnet generator as described herein, i.e. about 1.4 times higher voltage. It was found that the configuration of the permanent magnet generator described herein could generate higher voltages.

As described above, the generated voltage can be raised with the power generator described herein instead of enlarging the overall diameter and instead of increasing the weight of the magnets.

The invention claimed is:

1. A permanent magnet generator comprising:
a generator shaft;
at least three rotors, wherein each rotor is secured to the generator shaft, each rotor comprises a plate-shaped structure having a permanent magnet secured therewith, and each plate-shaped structure is disposed in the longitudinal direction of the generator shaft; and
a stator, the stator comprising a plate-shaped structure having a stator coil of a wound copper wire, wherein the stator coil is connected together in series in a single-phase, or connected together in series in a three-phase, and wherein the stator is disposed in at least two gaps formed by the rotors and is separated from the generator shaft;
wherein the rotors and the stator are disposed alternately with a total of not less than five stages in the longitudinal direction of the generator shaft;
wherein the polarity of the permanent magnets is aligned in an axial direction with opposite polarities of the permanent magnets directed toward each other from opposite sides of the same stator disposed in the gap therebetween such that magnetic lines of force representing the sum of the magneto-motive forces emanated from each of the magnets of all of the rotors pass through the magnets and gaps, enhancing each other's magnetic fields and strengthening the magnetic field in the gaps; and
wherein the rotors located at both ends have the permanent magnet attached to a plate-shaped yoke on a side which faces the stator, the yoke comprising magnetic material, wherein the magnetic flux generated from the magnetic poles can reflux through the plate-shaped yokes, thereby reducing a magnetic leakage from the rotors at the both ends.

2. The permanent magnet generator according to claim 1, wherein the rotors and the stator are disc-shaped; the permanent magnets secured with each rotor are disposed evenly-spaced apart from each other in a circumferential direction, with no less than four magnetic poles; and the stator coil is disposed evenly-spaced apart from each other in a circumferential direction, with no less than three poles in the stator.

3. The permanent magnet generator according to claim 1, wherein the stator coil is connected together in series in a single-phase, or connected together in series in a three-phase.

4. The permanent magnet generator according to claim 1, wherein the permanent magnet is a rare-earth magnet.

5. The permanent magnet generator according to claim 1, wherein the permanent magnet is a Nd-based rare-earth anisotropic sintered magnet.

6. The permanent magnet generator according to claim 1, wherein a rotor other than the rotors located at both ends is obtained by securing the permanent magnet with a nonmagnetic material.

7. A wind power generator obtained by installing a propeller on the shaft of the permanent magnet generator according to claim 1.

8. The permanent magnet generator according to claim 1, wherein the adjacent magnets in the same rotor have opposite polarities.

* * * * *